United States Patent
Koschig et al.

(10) Patent No.: US 9,657,810 B2
(45) Date of Patent: May 23, 2017

(54) FRICTION- AND WEAR-REDUCING JOINT FOR A BUSH CHAIN OR ROLLER CHAIN

(71) Applicant: IWIS MOTORSYSTEME GMBH & CO. KG, Munich (DE)

(72) Inventors: Richard Koschig, Freising (DE); Stefan Belmer, Anzing (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 78 days.

(21) Appl. No.: 14/418,884

(22) PCT Filed: Aug. 1, 2013

(86) PCT No.: PCT/EP2013/002299
§ 371 (c)(1),
(2) Date: Jan. 30, 2015

(87) PCT Pub. No.: WO2014/019699
PCT Pub. Date: Feb. 6, 2014

(65) Prior Publication Data
US 2015/0211603 A1    Jul. 30, 2015

(30) Foreign Application Priority Data

Aug. 3, 2012  (DE) .................. 10 2012 015 403
Aug. 13, 2012 (DE) .................. 10 2012 016 027

(51) Int. Cl.
*F16G 13/04* (2006.01)
*F16G 13/07* (2006.01)
*F16G 13/06* (2006.01)

(52) U.S. Cl.
CPC ............. *F16G 13/07* (2013.01); *F16G 13/04* (2013.01); *F16G 13/06* (2013.01)

(58) Field of Classification Search
CPC . F16G 5/18; F16G 13/04; F16G 13/06; F16H 9/24; B21L 15/005
(Continued)

(56) References Cited

U.S. PATENT DOCUMENTS 697,190  A  * 4/1902 Aultman ................. F16G 13/06
                                              305/204
1,951,764 A * 3/1934 Morse ..................... F16G 13/04
                                              474/214
(Continued)

FOREIGN PATENT DOCUMENTS

DE      1744245 U       5/1957
DE      4235198 A1      4/1993
(Continued)

*Primary Examiner* — Henry Liu
(74) *Attorney, Agent, or Firm* — Baker and Hostetler LLP

(57) ABSTRACT

A rocker joint for a bush chain or roller chain, comprises a bush having a through-passage running along the bush longitudinal axis, a first rocker surface formed in the through-passage, and a pin arranged in the through-passage of the bush and which has a second rocker surface formed thereon. A chain comprises inner and outer chain links, which are offset relative to each other, the inner and outer chain links being connected by rocker joints, each of which comprises a bush and a pin. A friction-reducing joint and a chain with reduced friction and less wear are provided, and thus a reduced $CO_2$ emission of the associated internal combustion engine, the chain being stable and easy to produce. This is achieved in that the bush is configured as a straight circular cylinder in which the through-passage is arranged in the bush eccentrically with respect to the longitudinal axis of the bush.

15 Claims, 5 Drawing Sheets

(58) Field of Classification Search
USPC .............. 474/214, 215, 216, 217, 241, 242
See application file for complete search history.

(56) References Cited

U.S. PATENT DOCUMENTS

| | | | | |
|---|---|---|---|---|
| 2,067,243 A * | 1/1937 | Perry | ............... | F16G 13/04 474/215 |
| 2,324,640 A * | 7/1943 | Perry | ............... | F16G 13/04 474/215 |
| 2,667,791 A * | 2/1954 | Bremer | ............... | F16G 13/04 474/214 |
| 3,340,745 A * | 9/1967 | McCann | ............... | F16G 13/04 474/213 |
| 3,661,025 A * | 5/1972 | Avramidis | ............... | F16G 13/04 474/217 |
| 3,916,709 A * | 11/1975 | Steuer | ............... | F16H 9/24 474/201 |
| 4,186,617 A * | 2/1980 | Avramidis | ............... | F16G 13/06 474/229 |
| 4,580,999 A * | 4/1986 | Ledford | ............... | F16G 5/18 474/201 |
| 4,622,025 A * | 11/1986 | Kern | ............... | F16G 5/18 474/242 |
| 4,650,445 A * | 3/1987 | Mott | ............... | F16G 5/18 474/201 |
| 4,666,421 A * | 5/1987 | Honda | ............... | F16G 5/18 474/242 |
| 4,710,154 A * | 12/1987 | Rattunde | ............... | F16H 9/24 474/201 |
| 4,729,756 A * | 3/1988 | Zimmer | ............... | F16G 13/06 474/214 |
| 4,911,682 A * | 3/1990 | Ivey | ............... | F16G 5/18 474/215 |
| 4,936,813 A * | 6/1990 | Ohzono | ............... | F16H 9/24 474/242 |
| 4,938,737 A * | 7/1990 | Yamamuro | ............... | F16G 5/18 474/242 |
| 5,007,883 A * | 4/1991 | Cole, Jr. | ............... | F16G 5/18 474/242 |
| 5,026,332 A * | 6/1991 | Mott | ............... | F16G 5/18 474/242 |
| 5,176,587 A * | 1/1993 | Mott | ............... | F16G 13/06 474/216 |
| 5,192,252 A * | 3/1993 | Skurka | ............... | F16G 13/06 474/210 |
| 5,423,724 A * | 6/1995 | Cole, Jr. | ............... | F16G 13/04 474/229 |
| 5,439,423 A * | 8/1995 | Okuwaki | ............... | F16G 5/18 474/242 |
| 5,700,217 A * | 12/1997 | Wakabayashi | ............... | F16G 13/04 474/214 |
| 5,803,852 A * | 9/1998 | Agostinelli | ............... | F16G 13/06 474/161 |
| 6,142,903 A * | 11/2000 | Heinrich | ............... | F16G 5/18 474/215 |
| 6,299,559 B1 * | 10/2001 | Friedmann | ............... | F16G 5/18 474/213 |
| 6,346,058 B1 * | 2/2002 | Linnenbrugger | ............... | F16G 5/18 474/212 |
| 6,406,396 B1 * | 6/2002 | Turner | ............... | F16G 5/18 474/206 |
| 6,527,657 B2 * | 3/2003 | Sakakibara | ............... | F16G 5/18 474/242 |
| 6,539,700 B2 * | 4/2003 | Linnenbrugger | ............... | B21L 9/065 474/219 |
| 6,558,281 B1 * | 5/2003 | Greiter | ............... | B21L 15/005 474/219 |
| 6,811,507 B2 * | 11/2004 | Baumann | ............... | B21L 15/005 148/206 |
| 7,056,248 B2 * | 6/2006 | Butterfield | ............... | F16G 13/04 474/212 |
| 7,179,184 B2 * | 2/2007 | Linnenbrugger | ............... | F16G 13/06 229/207 |
| 7,204,775 B2 * | 4/2007 | Teubert | ............... | F16G 5/18 474/206 |
| 7,967,710 B2 * | 6/2011 | Krause | ............... | F16G 5/18 474/206 |
| 7,993,229 B2 * | 8/2011 | Kamamoto | ............... | F16G 5/18 474/215 |
| 2001/0019979 A1 * | 9/2001 | Wakabayashi | ............... | F16G 5/18 474/245 |
| 2002/0049107 A1 * | 4/2002 | Ledvina | ............... | F16G 13/04 474/213 |
| 2002/0077205 A1 * | 6/2002 | Turner | ............... | F16G 5/18 474/242 |
| 2003/0186767 A1 * | 10/2003 | Greiter | ............... | B21L 15/005 474/215 |
| 2004/0248682 A1 * | 12/2004 | Wagner | ............... | F16G 5/18 474/215 |
| 2007/0087881 A1 * | 4/2007 | Baumann | ............... | F16G 5/18 474/215 |
| 2007/0149331 A1 * | 6/2007 | Yasuhara | ............... | F16G 5/18 474/215 |
| 2009/0053486 A1 * | 2/2009 | Cooke | ............... | C23C 18/32 428/209 |
| 2011/0177899 A1 * | 7/2011 | Botez | ............... | F16G 13/08 474/214 |

FOREIGN PATENT DOCUMENTS

| | | |
|---|---|---|
| DE | 102005047449 A1 | 9/2006 |
| DE | 202006015821 U1 | 3/2008 |
| DE | 102006052869 A1 | 5/2008 |
| EP | 0257661 A2 | 3/1988 |
| EP | 1065406 A1 | 1/2001 |
| EP | 1344961 A2 | 9/2003 |
| EP | 1455115 A1 | 9/2004 |
| EP | 1510727 A2 | 3/2005 |
| GB | 179331 A | 5/1922 |
| GB | 2128712 A | 5/1984 |
| WO | 2007134651 A1 | 11/2007 |

* cited by examiner

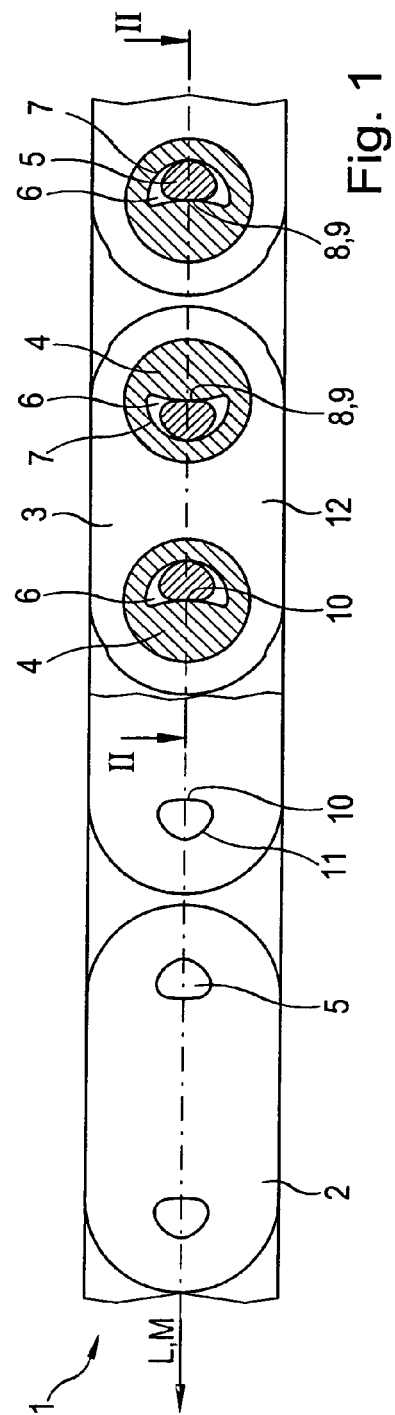
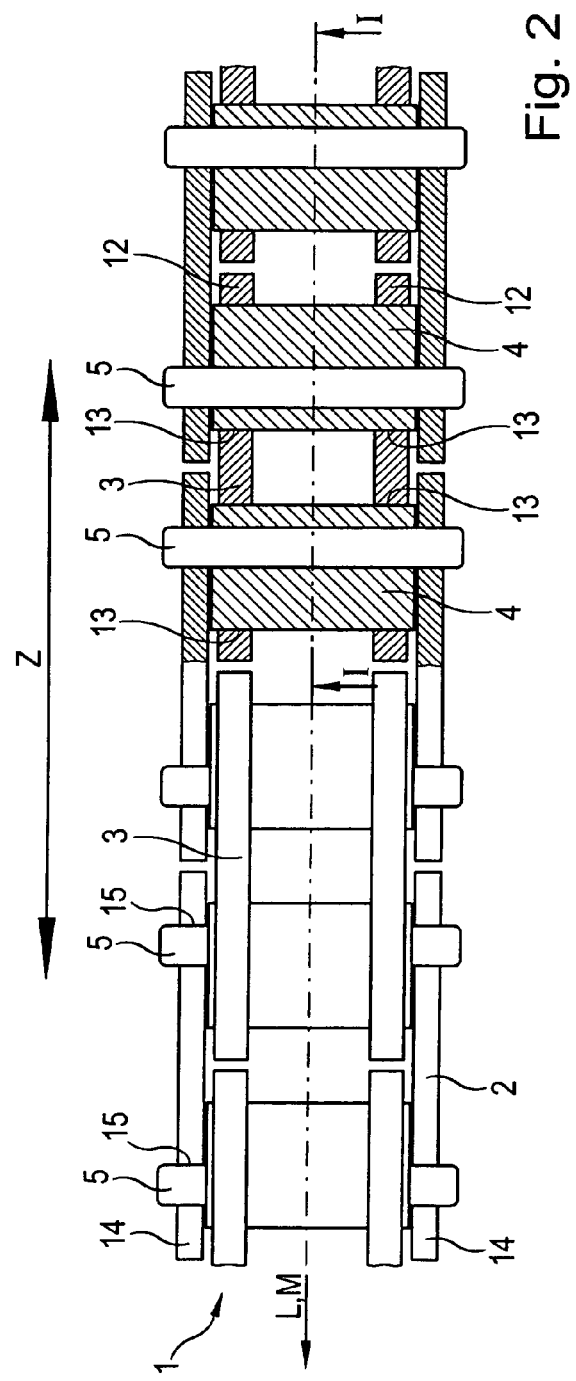

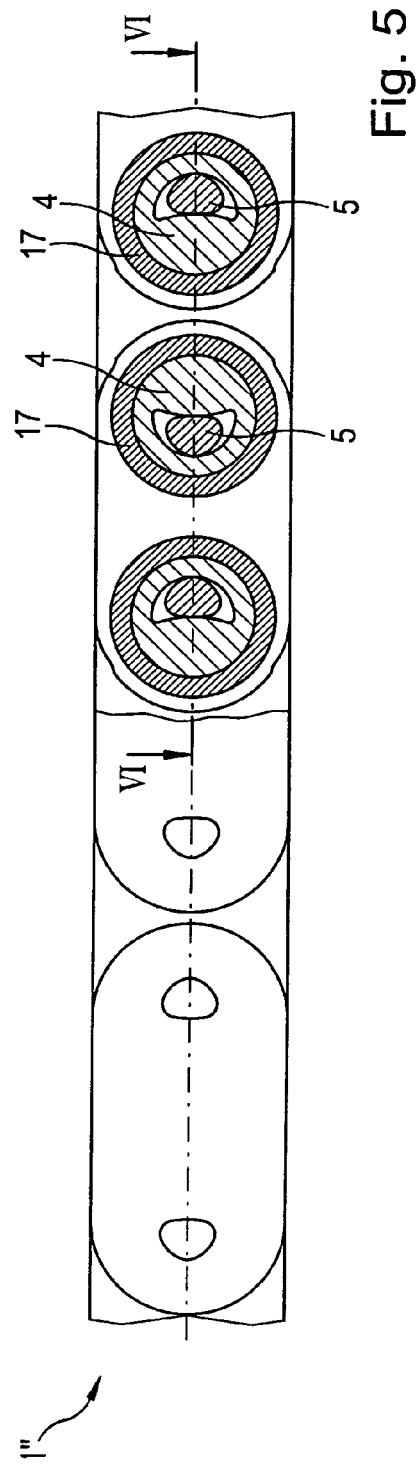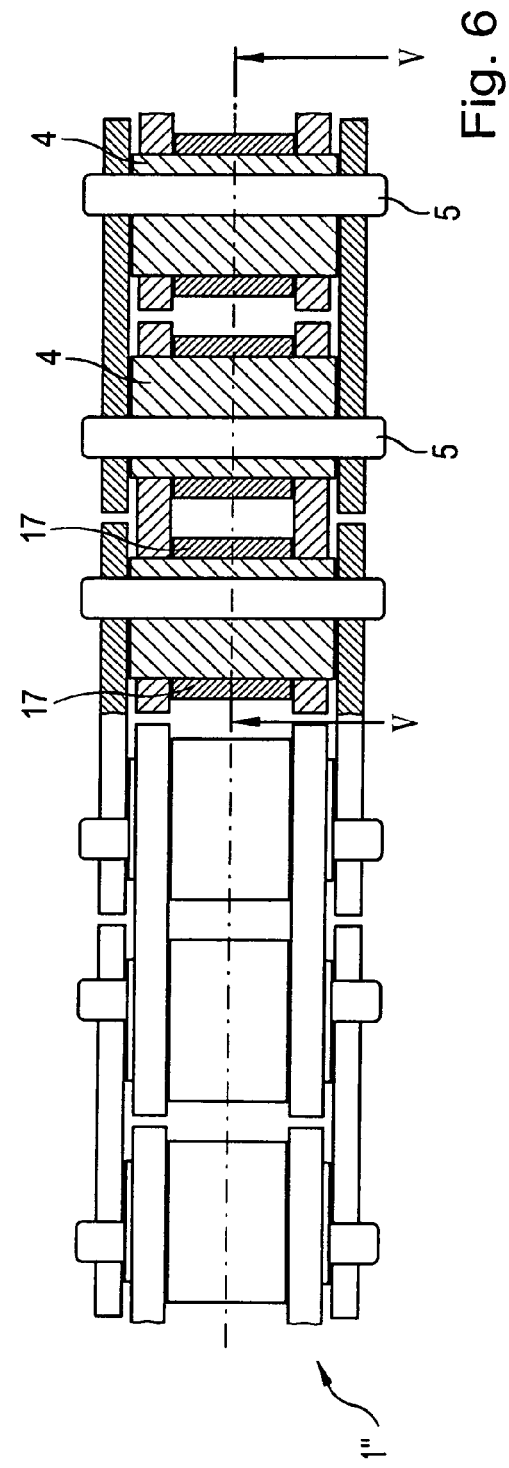

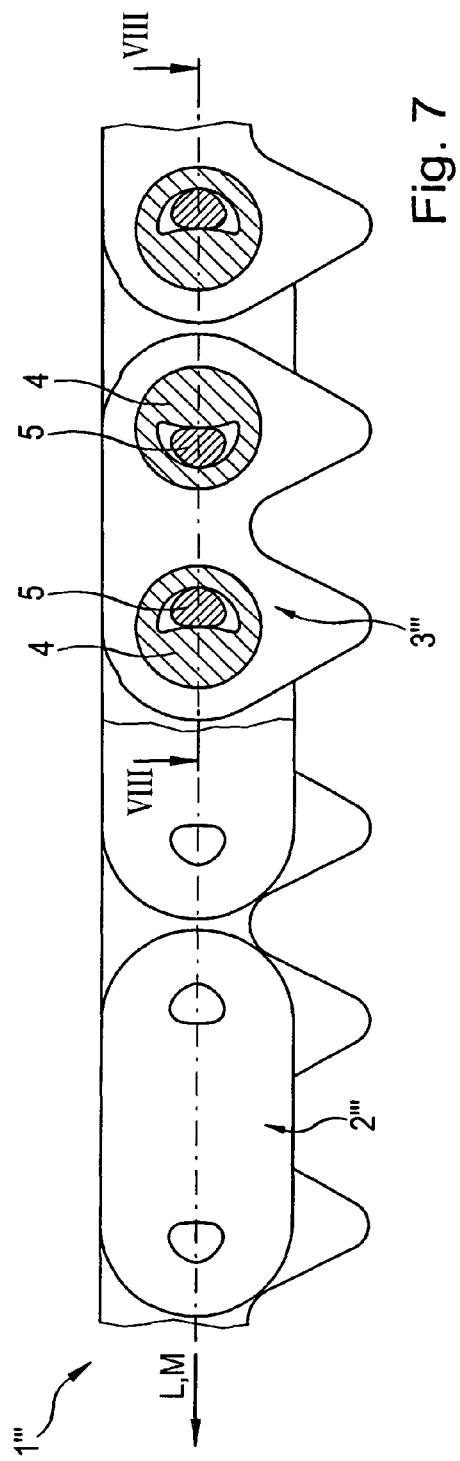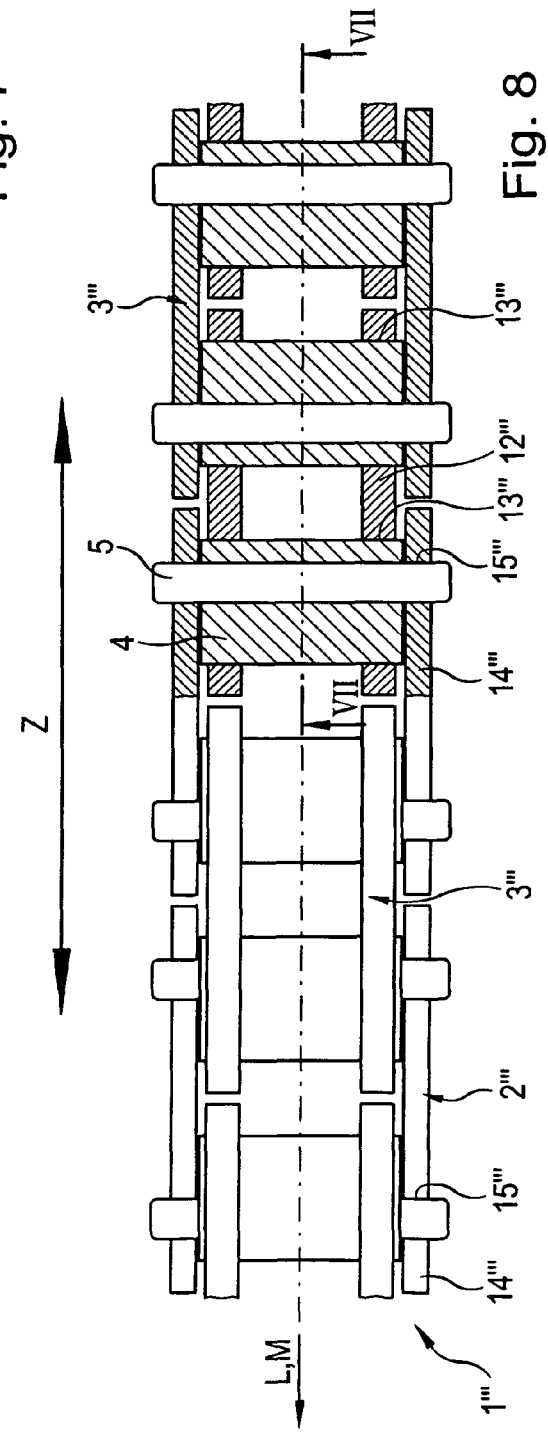

FRICTION- AND WEAR-REDUCING JOINT FOR A BUSH CHAIN OR ROLLER CHAIN

CROSS-REFERENCE TO RELATED APPLICATIONS

This application is a National Stage of International patent application PCT/EP2013/002299, filed on Aug. 1, 2013, which claims priority to foreign German patent application No. DE 102012015403.8, filed on Aug. 3, 2012, and to foreign German patent application No. DE 102012016027.5, filed on Aug. 13, 2012, the disclosures of which are incorporated by reference in their entirety.

The present invention relates to a rocker joint for a bush chain or a roller chain, comprising a bush which has a through-passage running along the bush longitudinal axis, a first rocker surface being formed in said through-passage, and further comprising a pin which is arranged in the through-passage of the bush and which has a second rocker surface formed thereon.

In addition, the present invention also relates to a chain with outer chain links and inner chain links, which are offset relative to the outer chain links, said outer chain links and inner chain links being connected to one another by means of rocker joints comprising each a bush, which has a through-passage running along the bush longitudinal axis and having a first rocker surface formed therein, and a pin arranged in the through-passage of the bush and having a second rocker surface formed thereon.

BACKGROUND

Such technical chains serve to transmit forces and movements. The above described bush chains, in which the chain hinge is formed by a bush and a pin attached thereto, as well as roller chains, in which an additional roller is arranged on the bushes, are used e.g. in chain drives and transmit torque and power. Fields of use are e.g. internal combustion engines, in particular the timing drive.

Bush chains consist of inner chain links and outer chain links which are offset relative to said inner chain links. The inner chain links normally comprise two inner link plates which each have two link plate openings. The bushes are press-fitted into the link plate openings and thus connect the two inner link plates. The outer chain links each comprise two outer link plates which also have two link plate openings each. The link plate openings of the outer chain links have inserted therein respective pins, said pins connecting the two outer link plates in this way. For connecting the inner chain links with the outer chain links, the pins are conducted through the bushes of the inner chain links, the outer chain links being offset relative to the inner chain links. In order to allow a larger chain width, also two or a plurality of these chains may be arranged in parallel and connected to one another.

One drawback of bush chains is that the bushes come again and again into contact with the same surfaces of the associated chain wheels, whereby an increased amount of wear occurs. It is therefore known to provide additional rollers on the bushes, which can rotate on said bushes. These so-called roller chains lead to a reduction of wear on the bushes.

Another drawback of the known bush and roller chains is the friction occurring, which leads to an increase in $CO_2$ emissions, when these chains are used in internal combustion engines.

Known solutions for reducing the friction in the case of bush or roller chains with conventional pin joints are e.g. the application of a friction-reducing coating to the individual components of a chain, cf. e.g. DE 10 2006 052 869 A1 or DE 20 2006 015 821 U1, or a reduction of the size of the contact surfaces between link plates and other interfaces, such as the tensioning rails or the guide rails.

DE 42 35 198 A1 describes a bush or roller chain in which the chain links are interconnected by means of rocker joints. The bushes of the rocker joints have a constant wall thickness and are provided with a recess on one side thereof, said recess defining a first rocker surface in the bush. The pins of the rocker joints define the second rocker surface.

SUMMARY OF THE INVENTION

It is the object of the present invention to improve the known chains still further and to provide robust, low-friction and low-wear chains which are stable and easy to produce.

As regards the rocker joint this object is achieved in that the bush is configured as a straight circular cylinder in which the through-passage is arranged in the bush eccentrically with respect to the longitudinal axis of said bush.

In the rocker joint, a rolling movement takes place between the two partners to the joint. This has the effect that the sliding movement between the partners to the joint is reduced, whereby friction is reduced as well. The reduced amount of friction leads to a reduction in the $CO_2$ emission of the engine. Since the outer surface of the bush has the shape of a straight circular cylinder, i.e. corresponds to a conventional round, rotationally symmetric bush, it is not necessary to modify the link plates. On the outer diameter of the bush, a press-fit connection with the respective link plate is realized all around. A higher load capacity and a good transmission of forces is thus possible. The bushes can simply be produced by means of extrusion.

According to an advantageous embodiment, the cross-section of the bush may be solid in the area in which no through-passage is formed. By means of this accumulation of material a higher stability of the bush wall is accomplished. When, in the case of conventional round, rotationally symmetric bushes having a uniform wall thickness, a bush is pressed into an inner link plate, a reduction of the bush diameter normally occurs on the inner contour in the area of influence of the press-fit. In order to prevent a pin, which is passed through the bush, to come only in two-point contact with the bush, the bush is normally prewidened at the points in question. Due to the accumulation of material in the solid cross-section of the bush, such deformation does not occur. Prewidening can be dispensed with or, if such prewidening is actually necessary, a very small width will suffice. The extrusion die is thus simplified.

According to still another embodiment, the free cross-section of the bush established by the through-passage may be approximately crescent-shaped. Hence, the internal free cross-section of the bushes is defined by a first circular segment on the outer side, said first circular segment corresponding approximately to the inner diameter of a standard rotationally symmetric bush. The opposite side of the internal free cross-section of the bush is defined by a second circular segment, which has a larger radius and which projects into the free cross-section in a convex manner. It follows that, when seen in a cross-sectional view, the bush comprises a solid, closed half, whereas the other half has formed therein the approximately crescent- or bean-shaped opening for the pin.

As regards the chain, the above described object is achieved according to the present invention in that the bush is configured as a straight circular cylinder in which the through-passage is arranged in the bush eccentrically with respect to the longitudinal axis of said bush. Since the outer surface of the bush corresponds to the outer surface of a standard rotationally symmetric bush, an all-around press-fit connection can be established between the bush and the associated link plates, so that a good connection and a good transmission of forces can be provided between the bushes and the link plates. The bushes can be produced in a simple manner by means of extrusion, whereby different wall thicknesses are realizable. The friction occurring when the chain is in operation is reduced, whereby the $CO_2$ emission of the engine will decrease.

According to an advantageous embodiment, the chain may be configured such that the cross-section of the bush is solid in the area in which no through-passage is formed. Therefore, it is not necessary to manufacture a recess for forming the rocker surface in the bush, so that the bush can be manufactured more easily. By means of the thus produced accumulation of material in the area of the rocking contour of the bush, a higher stability of the bush wall is accomplished. The bush is not compressed when it is press-fitted into the associated chain link plate, so that the inner contour of the bush does not change and the pin of the rocker joint abuts on the bush rocker surface along the entire length of the bush in the assembled condition of the chain. Hence, it is not necessary to remedy, e.g. by means of prewidening, a deformation of the inner surface or inner contour of the bush which occurs in the case of conventional rotationally symmetric bushes.

According to another embodiment, the free cross-section of the bush established by the through-passage may be approximately crescent-shaped. A simple configuration of the rocker surface is thus achieved and the accumulation of material in the bush will be possible.

Still another embodiment can be configured such that at least one of the bushes is provided with at least one hole extending through the bush wall into the through-passage of the bush. This hole may be configured as an orienting hole or it may be used for feeding a lubricant, e.g. oil, whereby the friction will be reduced still further.

According to another advantageous embodiment, the bushes may have rollers arranged thereon. The thus formed roller chain leads to a reduction of wear in the chain.

According to still another embodiment, at least the inner chain links may be provided with tooth plates. In this case the chain is configured as a tooth chain with the resultant advantages, such as smooth, accurate and quiet running.

Furthermore, at least one of the rocker surfaces of the rocker joints may be provided with a hard material layer. Since the chain has rocker joints provided therein, in which the movement of the joint takes place in the form of a rolling movement between the partners to the joint, the joints exhibit only a small amount of friction. This leads to a reduction of power losses in the chain drive and to a decrease in the $CO_2$ emission of the vehicle. Due to the hard material coating applied to at least one of the rocker surfaces, less wear occurs in the chain joint, whereby the elongation caused in the chain due to wear is reduced. An aspect which proved to be particularly advantageous for rocker joints is that, due to the hard material layer provided on at least one of the rocker surfaces, the resistance to high contact pressure per unit area of the joint is increased. Due to the small joint area, high contact pressures per unit area of the joint occur in rocker joints between the two partners to the joint. The hard material layer according to the present invention helps to reduce the damage caused in the joint by the contact pressure per unit area occurring. When chains according to the present invention are used in timing drives or mass balancing drives, in oil pump drives and in auxiliary unit drives, the hard material layer will have the effect that a high resistance to the aggressive combustion residues occurring in the oil environment will be achieved.

The hard material layer provided may also be a carbidic or nitridic hard material layer. The desired hardness and strength of the layer the is accomplished in this way.

According to an advantageous embodiment, the hard material layer may also be applied by means of CVD (Chemical Vapour Deposition). This is of advantage in particular in cases where the rocker joint is formed by a bush with a first rocker surface and a pin arranged in said bush, said pin being provided with the second rocker surface, since by means of a CVD process it is also easily possible to coat the interior hollow part of the bush.

The hard material layer may, however, also be applied by means of PVD (Physical Vapour Deposition). This is particularly advantageous in cases where a low process temperature is desired during application of the hard material layer.

According to still another embodiment, the layer thickness of the hard material layer applied by means of CVD may range from approx. 8 to 25 μm. This leads to good adherence of the hard material layer. Larger layer thicknesses normally result in break-offs, since the comparatively tenacious base material deforms, e.g. in the case of bending, and the hard carbidic layer has hardly any tenacity at all and flakes off.

In accordance with still another embodiment, the layer thickness of a layer applied by means of PVD ranges from 1 to 5 μm. These layer thicknesses can also be accomplished at acceptable process times.

BRIEF DESCRIPTION OF THE DRAWINGS

In the following, the present invention is explained in more detail making reference to drawings, in which FIG. 1 shows, in a fragmentary sectional view, a side view of a chain according to the present invention, FIG. 2 shows, in a fragmentary sectional view, a top view of the chain of FIG. 1, FIG. 5 shows, in a fragmentary sectional view, a side view of another embodiment of the chain, FIG. 6 shows, in a fragmentary sectional view, a top view of the chain of FIG. 5, FIG. 7 shows, in a fragmentary sectional view, a side view of still another embodiment of the chain, FIG. 8 shows, in a fragmentary sectional view, a top view of the chain of FIG. 7.

DETAILED DESCRIPTION

Figure 3:
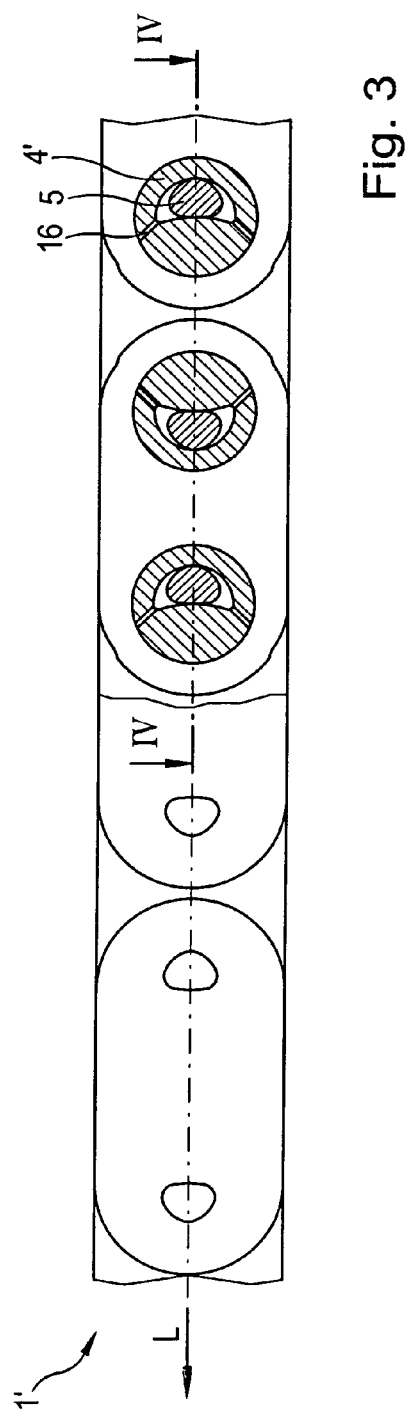
FIG. 3 shows, in a fragmentary sectional view, a side view of another embodiment of the chain.

FIG. 1 shows a side view of a chain 1 according to the present invention. The chain 1 is shown in a fragmentary sectional view along section lines I-I of FIG. 2. The chain 1 comprises outer chain links 2 and inner chain links 3 which are offset relative thereto, said outer and inner chain links being articulated on one another by means of bushes 4 and pins 5 arranged therein. The bushes 4 and the pins 5 are formed such that they define a rocker joint. The bushes 4 are therefore configured such that their internal free cross-section 6 has approximately the shape of a crescent, i.e. the internal free cross-section 6 of the bushes 4 is defined on one side thereof by a circular segment 7 corresponding to the internal diameter of a standard cylindrical bush. The opposite side of the internal free cross-section of the bush 4 is defined by a second circular segment 8 which is convex in shape and which therefore projects into the usually free cross-section of a standard cylindrical bush. This convex area 8 defines a rocker surface 9 of the bush 4. It follows that, when seen in a cross-sectional view, the bush 4 comprises a solid, closed half, whereas the other half has formed therein the approximately crescent- or bean-shaped opening for the pin 5.

FIG. 1 shows clearly that, when seen in a cross-sectional view, the bush 4 has a circular outer circumference. The circumferential surface of the bush 4 is thus configured as a straight circular cylinder and the circumference of the bush 4 is in full-area contact with the respective link plate openings 13 of the inner chain link plates 12.

The pins 5 have a flattened cross-section. The two longitudinal sides of the flattened cross-section of the pin have different curvatures. The side of the pin 5 having the weaker curvature 10 is associated with the rocker surface 9 of the bush 4. This rocker surface 10 of the pin abuts on the rocker surface 9 of the bush 4, so that the two rocker surfaces 9, 10 roll on one another, when the chain 1 is guided around a chain wheel (not shown). The opposite side 11 of the pin 5 has a stronger curvature which is adapted to the first circular segment 7 of the free cross-section 6 in the bush 4 and abuts on this outer side of the free cross-section 6 in the bush 4.

In FIG. 1 the bushes 4 are arranged in the inner chain links 3 such that the solid area of the cross-section of the bush 4 faces outwards towards the edges of the respective inner chain link 3 and the free cross-section 6 or internal diameter of the through-passage of the bush 4 faces the center of the respective inner chain link 3. This means that the bushes are installed in a direction opposite to the pulling direction Z of the chain. Under tensile load, the rocker surfaces 10 of the pins 5 are pressed against the rocker surfaces 9 of the bushes 4 and the desired function of the rocker joint, i.e. that the rocker surfaces 9, 10 of the bush 4 and of the pin 5 roll on one another, is guaranteed. The thus configured chain is consequently a pull chain.

As can clearly be seen in FIG. 1, both the pin 5 and the free cross-section 6 of the bush 4 are configured symmetrically with respect to the longitudinal direction L of the chain 1. In the straight condition of the chain 1, the point of contact between the rocker surface 10 of the pin 5 and the rocker surface 9 of the bush 4 is located on the center axis M of the chain 1.

FIG. 2 shows a top view of the chain 1 of FIG. 1, as a fragmentary sectional view along line II-II of FIG. 1. This top view shows that each inner chain link 3 consists of two inner link plates 12 which each have two link plate openings 13. These link plate openings 13 have press-fitted therein the bushes 4. Since the bushes 4 have a circular outer circumference, they are in full area contact with the link plate openings 13. Thus, a press-fit connection with the link plate 12 is established all around the outer diameter of the bushes 4. The bushes 4 may also be fixedly connected to the link plates 12 in some other way. The bushes 4 are press-fitted into the inner chain link plates 12 in an oriented manner. This means that the bushes 4 are press-fitted into the inner chain link plates 12 such that the rocker surface 9 of the bushes 4 has imparted thereto the desired orientation in a direction opposite to the pulling direction of the chain 1. The outer chain links 2 are offset relative to the inner chain links 3, and also they each comprise two outer chain link plates 14 having each two link plate openings 15. The link plate openings 15 have the pins 5 inserted therein. The connection between the inner chain links 3 and the outer chain links 2 is established in that the pins 5 are passed through the bushes 4. Hence, the pins 5 and the bushes 4 define the chain hinges.

In order to provide a chain 1 with low friction and low wear, at least one of the rocker surfaces 9, 10 of the rocker joint is coated with a hard material layer. The materials that may be used for the components defining the rocker surfaces, i.e. the bush 4 and the pin 5, are steels from the group of nitrided steels such as 34CrAlMo5, from the group of carbon steels such as C60E, from the group of alloyed steels such as 59CrV4, and from the group of roller bearing steels such as 100Cr6. All these steels are, however, subjected to a heat treatment prior to or subsequent to the coating operation, so as to toughen up the starting material for the high demands on fatigue strength. The hard material layer provided may consist e.g. of a carbidic layer such as chromium carbide, vanadium carbide, tungsten carbide, niobium carbide, titanium carbide, etc. as well as their coating derivatives. It is, however, also possible to apply a nitridic layer such as chromium nitride, vanadium nitride, tungsten nitride, niobium nitride, titanium nitride, etc. as well as their coating derivatives to one of the rocker surfaces 9, 10.

The hard material layer can be applied by means of chromizing or vanadizing in a CVD process (Chemical Vapour Deposition). When carbidic layers are applied, the carbon content of the steel must be at least 0.5%. The material used for the bushes 4 and pins 5 is then preferably C60E or 59CrV4. Carburizing of steels having a low carbon content (e.g. 34CrAlMo5) may be employed as well. Thus, a sufficient carbon potential for carbide formation is provided. In the case of carbidic layers, such as chromium carbide, the resultant layer thicknesses are between 8 and 25 µm. Higher layer thicknesses lead very often to break-offs under load, since the comparatively tenacious base material deforms (e.g. in the case of bending) and the hard carbidic layers have hardly any tenacity at all and flake off consequently. In CVD processes the components are fully coated due to the nature of such processes. Also interior geometries, such as the interior of the bushes 4, can be coated in this way.

Coating may also be executed by means of a PVD process (Physical Vapour Deposition). A chromium nitride (CrN) layer can, for example, be applied in this way. PVD is usually used for forming nitridic layers, but it may also be used for carbidic layers. Due to the process times, which are already long anyhow, the layers are usually only between 1 and 5 µm thick. Normally, a 100Cr6 steel is specially used as a base material for PVD-produced layers. It is, however, also imaginable to coat other materials, preferably less expensive materials, in this way. Also a carbon steel (e.g. C60E) could be used by way of example. PVD processes are primarily used for coating outer contours, since the surface to be coated should ideally be oriented perpendicular to the target as far as possible. In the case of inner contours, the extent to which the respective areas would be coated would therefore be left more to chance.

The above described protection layers made of hard material exhibit a very good wear resistance and are able to transmit high Hertzian stresses without material fatigue and subsequent breakage being caused. Making use of the hard material-coated rocker joint according to the present invention, a chain, in particular a tooth chain, can be provided, which exhibits low friction due to the rocker joint and is only subjected to little wear due to the hard material coating. In addition, the desired jerk- and vibration-free as well as quiet running of the chain is achieved.

In order to make the manufacturing process as easy as possible, the whole pin 5 may be provided with the hard material layer. However, it is also possible to coat only subareas of the pin 5, e.g. only the rocker surface 10 of the pin 5. In addition, it is imaginable to coat only the bush 4 or only subareas of the bush 4, e.g. only the rocker surface 9 of the bush 4.

A particularly wear-resistant rocker joint will, however, be provided when the interior of the bush 4 as well as the pin 5 are coated with the hard material layer. By means of a rocker joint configured in this way, it is possible to provide chains having wear characteristics similar to those of known chains with pin joints, said first-mentioned chains leading, however, to substantially lower power losses in the chain drive system, and this has a positive effect on the total $CO_2$ emission of a vehicle.

A special characteristic of the above-described rocker surfaces coated with a hard material layer is that they exhibit a high resistance to combustion residues occurring in the oil environment of the timing drive. Chains having these rocker joints coated with a hard material layer are therefore adapted for use in timing drives, auxiliary unit drives, mass balancing drives and oil pump drives.

A further variant of a chain 1' according to the present invention is shown in FIG. 3. Also this chain 1' is shown in a fragmentary sectional view along line III-III of FIG. 4. The structural design of this chain 1' corresponds substantially to the structural design of the above described chain 1. In the following, only the differences will be described. In the chain 1' according to FIG. 3, the bushes 4' are provided with holes 16 extending continuously from the outside through the wall of the bushes to the opening or internal cross-section 6 of the bushes. These holes 16 can be utilized as orienting holes or as holes for feeding lubricant to the rocker joint.

Figure 4:
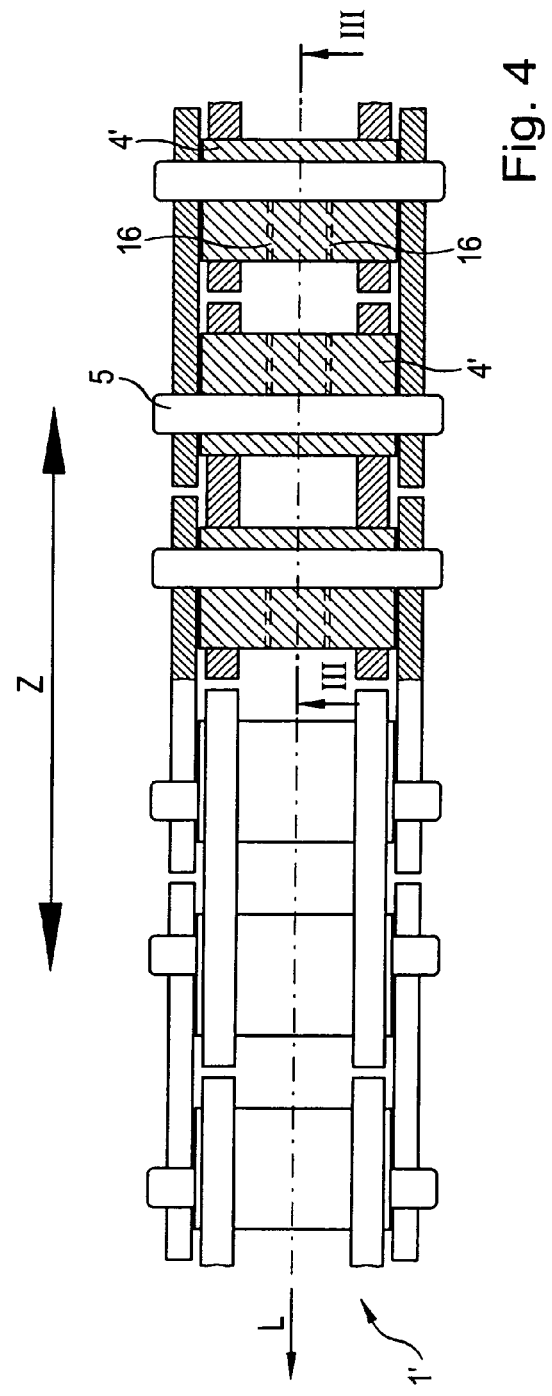
FIG. 4 shows, in a fragmentary sectional view, a top view of the chain of FIG. 3.

FIG. 4 shows a top view of the chain 1' according to FIG. 3, in a fragmentary sectional view along line VI-VI of FIG. 3. In FIG. 4 it can be seen that each bush 4' has two holes 16 provided therein. This allows the rocker joint, i.e. the contact surface between the pin 5 and the bush 4', to be effectively supplied with lubricant.

FIGS. 5 and 6 show still another embodiment of a chain 1" according to the present invention. The structural design of this chain 1" corresponds again to a very large extent to the chains that have already been described, and identical reference numerals are used for identical components. In the following, only the differences will be described. The chain 1" shown in FIGS. 5 and 6 is a roller chain, i.e. the structural design of the chain 1" corresponds to the structural design of the chain 1 shown in FIG. 1, the bushes 4 having, however, additionally attached thereto rollers 17. The rollers 17 move on the bushes 4 and contribute thus to a reduction of wear of said chain 1".

Still another embodiment of a chain 1''' according to the present invention is shown in FIGS. 7 and 8. Also in this case, it is such that the structural design of said chain 1''' substantially corresponds to the structural design of the above-shown chains and that identical reference numerals are therefore used for identical components and only the differences are described in the following. The chain 1''' is a bush joint tooth chain, i.e. at least the chain link plates 12''' of the inner chain links 3 of the chain 1''' are provided with tooth plates as link plates. The inner chain link plates 12''' are again provided with link plate openings 13''', the bushes 4 being inserted in said link plate openings 13''' and fixedly connected thereto, i.e. through press-fitting. The bushes are configured and arranged in the way that has already been described hereinbefore. The pins 5 are arranged in the bushes 4 and connected to the outer chain link plates 14''' so that the pins will be oriented in the desired way. The outer chain links 2''' and the outer chain link plates 14''' need not be configured as tooth plates, but may e.g. be configured as guide plates.

FIG. 8 shows a top view of the chain 1''' according to the present invention, said view being a fragmentary sectional view along section lines VIII-VIII of FIG. 7. It can clearly be seen that the bushes 4 are secured in position in the inner chain link plates 12''' of the inner chain links 3''', e.g. through press-fitting. The bushes 4 are thus oriented in the desired way in said chain 1'''. The bushes 4 have the pins 5 arranged therein, said pins 5 being mounted in link plate openings 15''' in the outer chain link plate 14'''.

Figure 9:
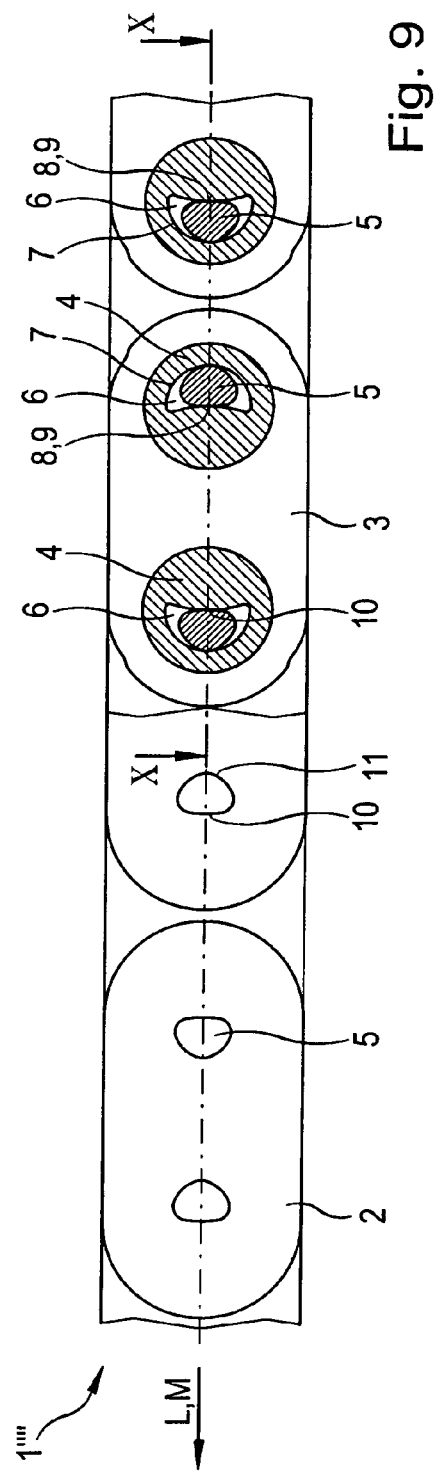
FIG. 9 shows, in a fragmentary sectional view, a side view of still another embodiment of the chain.

In FIG. 9 a further embodiment of a chain 1'''' is shown. The chain 1'''' comprises substantially the same components as the chain 1 shown in FIGS. 1 and 2. Identical components are therefore designated by identical reference numerals. In the following, only the differences between the chains will be described. The chain 1'''' according to FIG. 9 has the bushes 4 as well as the pins 5 installed therein such that they are rotated by 180° relative to the chain 1. Also in this case, the pins 5 are again arranged such that, when seen in a cross-sectional view, they are mirror-symmetric with respect to the longitudinal axis L of the chain 1''''. Likewise, the bushes 4 are arranged such that their cross-section is mirror-symmetric with respect to the longitudinal direction L of the chain 1'. However, the bushes 4 are now fixed in position in the inner chain link plates 12 such that their free cross-section 6 faces outwards, i.e. towards the edges of the inner chain link plates 12. The bushes 4 are consequently installed in the thrust direction S of the chain 1''''. This chain 1'''' is a push chain, i.e. when a thrust load is applied thereto the rocker surfaces 9, 10 of the bush 4 and of the pin 5 are pressed against one another and the desired function of the rocker joint is achieved.

Figure 10:
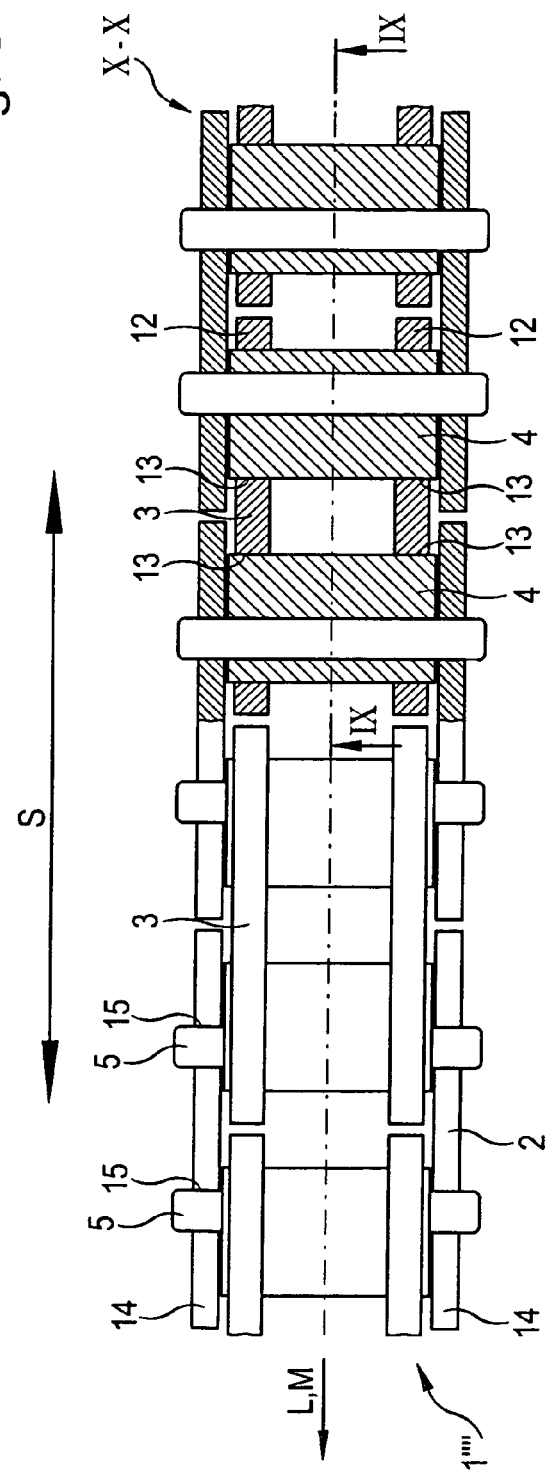
FIG. 10 shows, in a fragmentary sectional view, a top view of the chain of FIG. 9.

FIG. 10 shows a top view of the chain 1'''' according to FIG. 9, said view being a fragmentary sectional view along the line IV-IV of FIG. 9. Also in this case, it can be seen that the pins 5 are still arranged in the interior of the inner chain link plates 12.

The invention claimed is:

1. A rocker joint for a bush chain or a roller chain, comprising a unitary bush which has a through-passage running along a longitudinal axis of the unitary bush, a first convex rocker surface being formed in said through-passage, and further comprising a pin which is arranged in the through-passage of the unitary bush and which has a second convex rocker surface formed thereon, wherein the unitary bush is configured as a straight circular cylinder with a solid cross-section in a direction perpendicular to the longitudinal axis of the unitary bush except for the through-passage which is arranged in the unitary bush eccentrically with respect to the longitudinal axis of the unitary bush, and wherein the solid-cross section of the unitary bush is at least 50% of a total cross-section area of the unitary bush.

2. The rocker joint according to claim 1, wherein the free cross-section of the unitary bush established by the through-passage is approximately crescent-shaped.

3. The rocker joint according to claim 1, wherein the through-passage is crescent-shaped or bean-shaped.

4. A chain with outer chain links and inner chain links, which are offset relative to said outer chain links, said outer chain links and said inner chain links being connected to one another by means of rocker joints, and said rocker joints each comprising a unitary bush which has a through-passage running along a longitudinal axis of the unitary bush, a first convex rocker surface being formed in said through-passage, and further comprising a respective pin which is arranged in the through-passage of the unitary bush and which has a second convex rocker surface formed thereon,
  wherein the unitary bush is configured as a straight circular cylinder with a solid cross-section in a direction perpendicular to the longitudinal axis of the unitary bush except for the through-passage which is arranged in the unitary bush eccentrically with respect to the longitudinal axis of the unitary bush, and
  wherein the solid-cross section of the unitary bush is at least 50% of a total cross-section area of the unitary bush.

5. The chain according to claim 4, wherein the free cross-section of the unitary bush established by the through-passage is approximately crescent-shaped.

6. The chain according to claim 4, wherein the unitary bush is provided with at least one hole extending through a bush wall of the unitary bush into the through-passage of the bush.

7. The chain according to claim 4, wherein the unitary bush includes a roller arranged thereon.

8. The chain according to claim 4, wherein at least the inner chain links are provided with tooth plates.

9. The chain according to claim 4, wherein at least one of the rocker surfaces of the rocker joints is provided with a hard material layer.

10. The chain according to claim 9, wherein the hard material layer is a carbidic or nitridic hard material layer.

11. The chain according to claim 9, wherein the hard material layer is applied by means of CVD (Chemical Vapour Deposition).

12. The chain according to claim 9, wherein the hard material layer is applied by means of PVD (Physical Vapour Deposition).

13. The chain according to claim 11, wherein the layer thickness of the hard material layer ranges from approx. 8 to 25 µm.

14. The chain according to claim 12, wherein the layer thickness of the hard material layer ranges from approx. 1 to 5 µm.

15. The chain according to claim 4, wherein the through-passage is crescent-shaped or bean-shaped.

* * * * *